(12) United States Patent
Asner

(10) Patent No.: US 8,416,994 B2
(45) Date of Patent: Apr. 9, 2013

(54) REMOTE SENSING ANALYSIS OF FOREST DISTURBANCES

(75) Inventor: Gregory P. Asner, Half Moon Bay, CA (US)

(73) Assignee: Carnegie Institution of Washington, Washington, DC (US)

( * ) Notice: Subject to any disclaimer, the term of this patent is extended or adjusted under 35 U.S.C. 154(b) by 0 days.

(21) Appl. No.: 13/459,804

(22) Filed: Apr. 30, 2012

(65) Prior Publication Data

US 2012/0288159 A1 Nov. 15, 2012

Related U.S. Application Data

(63) Continuation of application No. 12/083,833, filed as application No. PCT/US2006/040814 on Oct. 19, 2006, now Pat. No. 8,189,877.

(60) Provisional application No. 60/728,733, filed on Oct. 21, 2005.

(51) Int. Cl.
*G06K 9/00* (2006.01)

(52) U.S. Cl.
USPC .......................................... 382/110

(58) Field of Classification Search .................. 382/100, 382/110, 284, 225, 191, 103, 274; 348/578, 348/E3.032, E5.09, 144; 702/2, 5
See application file for complete search history.

(56) References Cited

U.S. PATENT DOCUMENTS

| 5,565,998 A | 10/1996 | Coombs et al. |
| 6,484,099 B1 | 11/2002 | Holzer-Popp et al. |
| 2005/0104771 A1 | 5/2005 | Terry et al. |

OTHER PUBLICATIONS

Qi, Jiaguo, et al., "Improved Selective Logging Detection with Landsat Images in Tropical Regions," Nov. 7, 2002, Geoscience and Remote Sensing Symposium, 2002, IGARSS '02, 2002 IEEE International, vol. 4, pp. 2078-2080.

*Primary Examiner* — Atiba O Fitzpatrick
(74) *Attorney, Agent, or Firm* — Morgan Lewis & Bockius, LLP

(57) ABSTRACT

The present invention provides systems and methods to automatically analyze Landsat satellite data of forests. The present invention can easily be used to monitor any type of forest disturbance such as from selective logging, agriculture, cattle ranching, natural hazards (fire, wind events, storms), etc. The present invention provides a large-scale, high-resolution, automated remote sensing analysis of such disturbances.

13 Claims, 10 Drawing Sheets

REMOTE SENSING ANALYSIS OF FOREST DISTURBANCES

STATEMENT REGARDING FEDERALLY SPONSORED RESEARCH OR DEVELOPMENT

This application is a Continuation Application of U.S. patent application Ser. No. 12/083,833, filed on Mar. 9, 2009 now U.S. Pat. No. 8,189,877, which is a National Stage Patent Application of Application No. PCT/US2006/040814, filed on Oct. 19, 2006, and claims the benefit of United States Provisional Application No. 60/728,733, filed on Oct. 21, 2005, all of which are hereby incorporated by reference in their entirety.

BACKGROUND OF THE INVENTION

Tropical forests have been threatened by increasing rates of deforestation or clear-cutting during the past three or more decades (E. F. Lambin, H. J. Geist, E. Lepers, *Ann. Rev. Environ. Res.* 28, 205 (2003)). Although deforestation, largely for conversion of land to food crops or pastures, is the major destructive force in tropical forests worldwide, other forest disturbances such as the selective harvest of timber have increased in frequency and extent (D. C. Nepstad et al., *Nature* 398, 505 (1999), L. M. Curran et al., *Science* 303, 1000 (2004)). In selective logging, a limited number of marketable tree species are cut, and logs are transported off-site to sawmills. Unlike deforestation that is readily observed from satellites, selective logging in the Brazilian Amazon causes a spatially diffuse thinning of large trees that is hard to monitor using satellite observations. Selective logging causes widespread collateral damage to remaining trees, sub-canopy vegetation and soils, with impacts on hydrological processes, erosion, fire, carbon storage, and plant and animal species.

There is surprisingly little known about the extent or impacts of selective logging throughout the tropical forests of the world, including the Amazon Basin. A survey of sawmills in the Brazilian Amazon suggested that 9,000-15,000 $km^2$ of forest had been logged in 1996-97 (D. C. Nepstad et al., *Nature* 398, 505 (1999)). The large uncertainty in this reported area resulted from necessary assumptions of the wood volume harvested per area of forest. Sawmill surveys can, at best, provide only a general idea of where and how much logging occurs because most operators buy timber at the mill gate rather than harvesting the wood themselves.

Objective, spatially-explicit reporting on selective logging requires either labor-intensive field surveys in frontier and often violently contested areas, or by remote detection and monitoring approaches. Previous studies of small areas show the need for high-resolution observations via satellite. Moreover, most of the traditional analysis techniques employed for localized selective logging studies have proven insufficient for large-scale selective logging assessments. A detailed comparison of Landsat satellite observations against field measurements of canopy damage following selective logging proved that traditional analytical methods missed about 50% of the canopy damage caused by timber harvest operations (G. P. Asner, M. Keller, R. Pereira, J. Zweede, *Rem. Sens. Environ.* 80, 483 (2002)).

BRIEF SUMMARY OF THE INVENTION

The present invention provides systems and methods for automatically analyzing Landsat satellite data of forests. The present invention can easily be used to monitor any type of forest disturbance, such as, but not limited to, logging, agriculture, cattle ranching, natural hazards (fire, wind events, storms), etc.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

DETAILED DESCRIPTION OF THE INVENTION

All publications and patent applications herein are incorporated by reference to the same extent as if each individual publication or patent application was specifically and individually indicated to be incorporated by reference.

The following description includes information that may be useful in understanding the present invention. It is not an admission that any of the information provided herein is prior art or relevant to the presently claimed inventions, or that any publication specifically or implicitly referenced is prior art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

The computational analysis of Landsat Enhanced Thematic Mapper Plus (ETM+) satellite data was advanced using the new Carnegie Landsat Analysis System (CLAS) to detect and quantify the amount of selective logging in the major timber production States of the Brazilian Amazon. The approach provides automated image analysis using atmospheric modeling, detection of forest canopy openings, surface debris, and bare soil exposed by forest disturbances, and pattern recognition techniques. As discussed in greater detail below, CLAS provides detailed measurements of forest canopy damage at a spatial resolution of 30×30 meters, and it does so over millions of square kilometers of forest.

Figure 1:
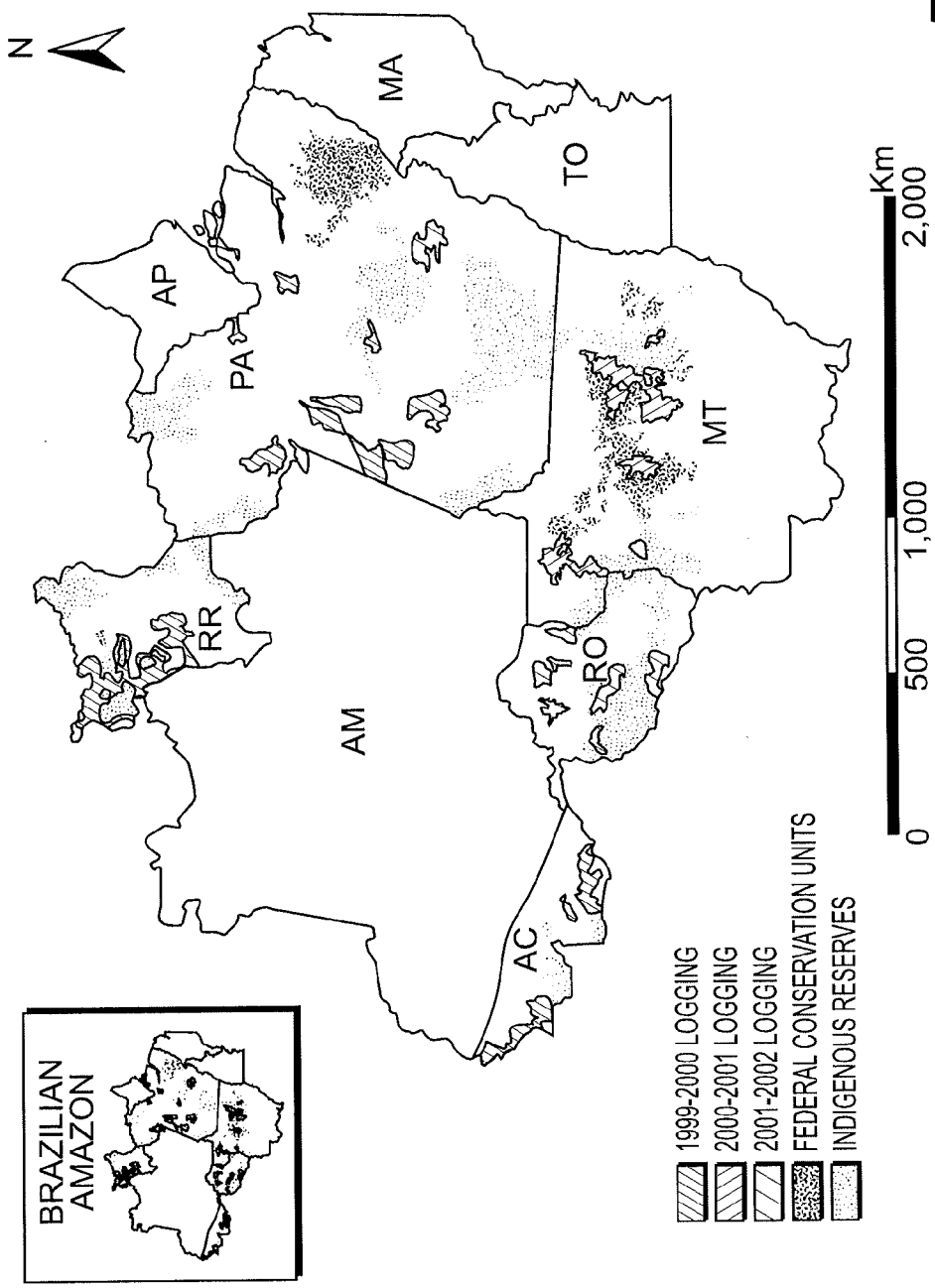
FIG. 1 depicts spatial distribution of selective logging in five timber production states of the Brazilian Amazon for the year intervals 1999-2000 (red), 2000-2001 (blue), and 2001-2002 (green). The states of Amazonas (AM), Amapa (AP), Tocantins (TO), Maranhao (MA), and the southern non-forested part of Mato Grosso were not included in the analysis. Light gray areas show the extent of indigenous reserves; dark gray areas delineate federal conservation lands as of 1999 Instituto-Socioambiental. (São Paulo, Brazil, 1999) Map of forest types, land-use change and protected areas in the Amazon).
Figure 2:
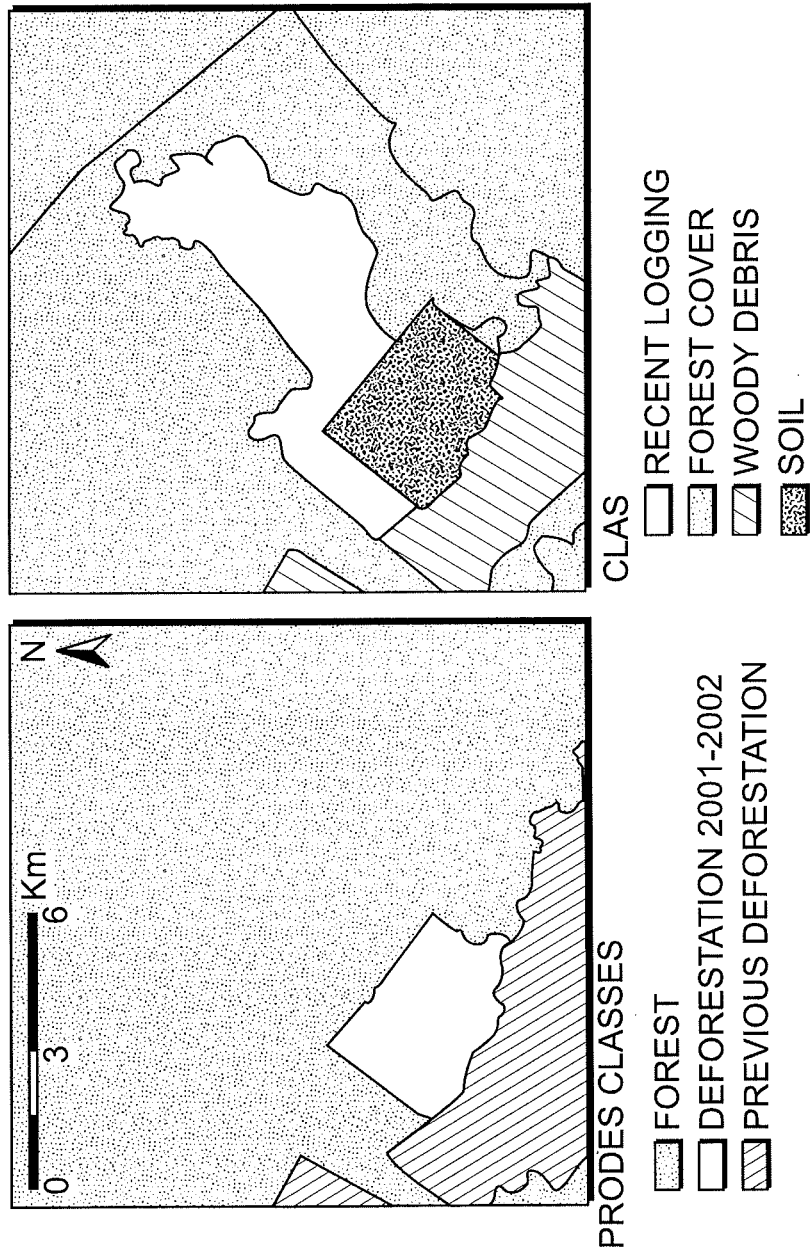
FIG. 2 depicts a high resolution example of selective logging results in 2001-2002 from the CLAS processing in comparison to deforestation mapping provided by the Brazilian National Institute for Space Research (INPE (Instituto Nacional de Pesquisas Espaciais), "PRODES: Assessment of Deforestation in Brazilian Amazonia (http://www.obt.inpe.br/prodes/index.html)" (2005)).

CLAS was applied to five states—Pará, Mato Grosso, Rondônia, Roraima, and Acre—that account for ~90% of all deforestation in the Brazilian Amazon. The analysis was conducted on a time-series of Landsat ETM+ imagery from 1999 to 2002. Across the five timber producing Brazilian states, the annual extent of selective logging ranged from 12,135 to 20,651 km$^2$ (FIG. 1). These logging results represent new forest damage not accounted for in deforestation studies. Each year, the overlap between the results and the Brazilian National Institute for Space Research (INPE) annual deforestation maps was only 6% (±5%). Moreover, only 19% (±11%) of the total area logged in any given year was subsequently deforested three years later. Selective logging thus adds 60-128% more forest area damage than has been reported for deforestation alone in the same study period (Table 1). Selective logging was concentrated in the states of Mato Grosso and Pará, where logging areas exceeded or nearly matched deforestation areas. In other smaller states, selective logging increased forest damage area by 10-35% over reported deforestation rates (Table 1).

TABLE 1

Selective-logging rates from 1999-2002 in five major timber-producing states of the Brazilian Amazon, with comparison to the deforestation rates reported by INPE (2005).

| State | 1999-2000 rates (km$^2$ yr$^{-1}$) Logged | | 2000-01 rates (km$^2$ yr$^{-1}$) Logged | | 2001-02 rates (km$^2$ yr$^{-1}$) Logged | |
|---|---|---|---|---|---|---|
| | Logged | Deforested | Logged | Deforested | Logged | Deforested |
| Acre | 64 | 547 | 53 | 419 | 111 | 727 |
| Mato Grosso‡ | 13,843 | 6,176 | 7,912 | 7,504 | 7,267 | 6,880 |
| Pará | 5,939 | 6,671 | 5,343 | 5,237 | 3,791 | 8,697 |
| Rondônia | 773 | 2,465 | 923 | 2,673 | 946 | 3,605 |
| Roraima | 32 | 253 | 55 | 345 | 20 | 54 |
| Total | 20,651 | 16,112 | 14,286 | 16,178 | 12,135 | 19,963 |

‡Only the northern 58% of Mato Grosso containing forested lands was included in the analysis.

Conservation units such as indigenous reserves, parks and national forests generally afforded protection against logging. However, exceptions included areas in northern Mato Grosso, where up to 880, 291, and 50 km$^2$ of logging were measured each year in the Xingu, Aripuanã, and Serra Morena indigenous reserves, respectively (FIG. 1). In the southern portion of Pará state, major logging disturbances were observed in the Menkragnoti and Kayapó indigenous reserves, with up to 261 and 198 km$^2$ detected each year between 1999 and 2002. Federal forest reserves of Acre, Gorotire (Pará), and Juruena (Mato Grosso) were harvested for timber at rates of up to 23, 90, and 380 km$^2$ each year, respectively.

Extensive field validation studies showed that the canopy damage detection within CLAS is precise and accurate, as set forth below in the Materials and Methods section. Field validation studies showed false-positive and false-negative detection rates of only 5%. Uncertainty caused by errors in atmospheric correction of satellite data, cloud cover, annualization, automated logging area delineation and manual auditing were 0.7-12.8% individually. After combining all known sources of error, the analysis suggests an overall absolute uncertainty of up to 14% in total logging area.

Selective logging contributes substantially to gross carbon fluxes from the Brazilian Amazon. Forest damage results from CLAS were combined with field-based forest canopy gap fraction and roundwood extraction data to calculate the total wood extraction rates. In 2000, 2001 and 2002, roundwood production averaged 49.8, 29.8 and 26.6 million cubic meters, respectively. The mean annual harvest intensities were 26.6, 21.7 and 21.4 m$^3$ ha$^{-1}$, which were generally lower than those reported by sawmill owners in 1996. Nepstad et al. (1999) interviewed sawmill operators to estimate harvest intensities of 19, 28 and 40 m$^3$ per hectare in 1996. The total volume harvested equates to 10-15 million metric tons of carbon removed. In addition to roundwood, residual stumps, branches, foliage and roots are left to decompose in the forest, subsequently returning to the atmosphere as carbon dioxide over about a decade. The calculated average harvest intensity of 23.2 m$^3$ ha$^{-1}$ equates to ~8 Mg C ha$^{-1}$ contained in roundwood, with an associated 34-50 Mg C ha$^{-1}$ of fine and coarse debris. The conversion of roundwood to carbon assumes an average wood specific gravity of 0.7 Mg m$^{-3}$ and a proportional carbon content of 0.5 as in Keller et al. (2004a). Fallen debris creation was estimated based on data from Keller et al. (2004b) based on mean debris amounts found in logged forests (~30 m$^3$ ha$^{-1}$ harvested) subtracting the woody debris found in undisturbed forests. Upper and lower estimates were based on mean debris amounts plus root mean squared (RMS) error accounting for the uncertainty of estimates for both background and logged sites. Total debris was estimated as 1.4 times fallen debris to account for standing dead and roots (Keller et al., 2001). Integrated to the regional scale, the processing of roundwood and decomposition of residues lead ultimately to a gross flux of carbon from the forest of up to 0.08 billion metric tons for each year of logging. The regional gross flux of carbon was estimated by multiplication of the range of carbon densities of debris created by the area logged. The range includes both variation in the annual area logged and uncertainty in the amount of debris created during logging. This value increases the estimated gross annual anthropogenic flux of carbon from Amazon forests by up to 25% over carbon losses from deforestation alone. Post-harvest forest regeneration reduces the net flux of carbon to the atmosphere below these values but the pace of regeneration after logging varies considerably.

Selective logging doubles previous estimates of the total amount of forest degraded by human activities (Table 1), a result with potentially far-reaching implications for the ecology of the Amazon forest and the sustainability of the human enterprise in the region. In the future, improved monitoring of tropical forests will require high performance satellite observations and new computational techniques. The results, presented with explicit uncertainty analysis and transparency of method, have located and quantified ubiquitous but previously cryptic disturbances caused by selective logging.

Definitions.

As used herein, each of the following terms has the meaning associated with it in this section.

The articles "a" and "an" are used herein to refer to one or to more than one (i.e. to at least one) of the grammatical object of the article. By way of example, "an element" means one element or more than one element.

As used herein, the term "deforestation" refers to clear-cutting and conversion of the forest to other land uses, such as cattle pasture, crop agriculture, and urban and suburban areas.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

EXPERIMENTAL EXAMPLES

The invention is now described with reference to the following examples. These examples are provided for the purpose of illustration only and the invention should in no way be construed as being limited to these examples but rather should be construed to encompass any and all variations which become evident as a result of the teaching provided herein.

The materials and methods used in the experiments presented in this Example are now described.

Materials and Methods

Processing Methodology

The Carnegie Landsat Analysis System (CLAS) includes a general purpose computer programmed to use high spatial resolution satellite data for regional and global studies of forest disturbance. The computer system used is a multi-processor Linux system, but other systems can be used. CLAS is an automated processing system that includes: (i) atmospheric correction of satellite data; (ii) deconvolution of spectral signatures into sub-pixel fractional cover of live forest canopy, forest debris and bare substrates; (iii) cloud, water, and deforestation masking; and (iv) pattern recognition algorithms for forest disturbance mapping. The following sections provide a detailed description of CLAS, illustrated by FIG. 3.

Image Preparation and Atmospheric Correction

Figure 3:
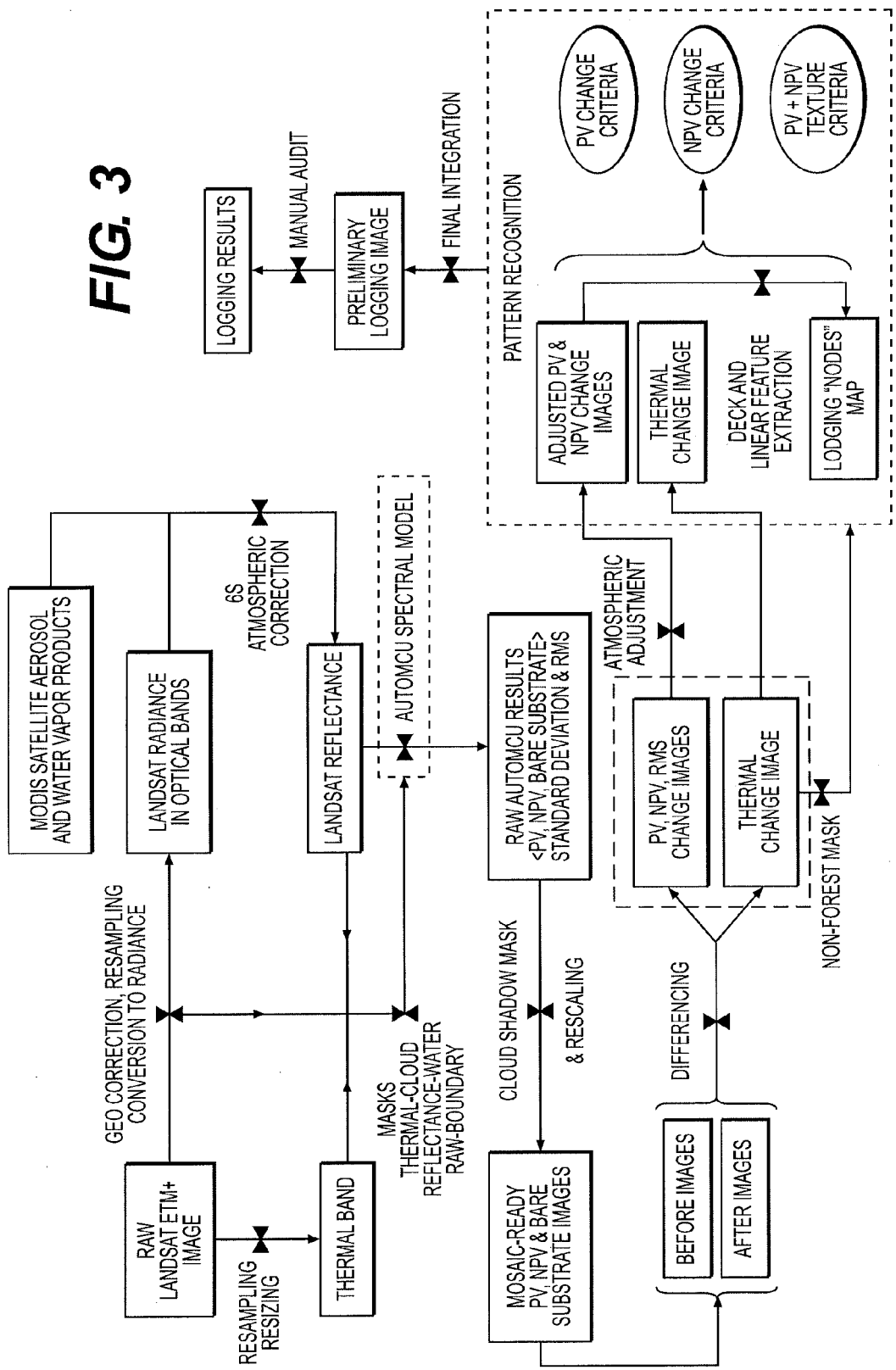
FIG. 3 depicts the Carnegie Landsat Analysis System (CLAS) processing stream.

The version of CLAS presented here ingests raw Landsat Enhanced Thematic Mapper Plus (ETM+) satellite imagery and applies sensor gains and offsets to convert from digital number (DN) to exo-atmospheric radiance. The radiance data are passed to a fully automated version of the 6S atmospheric radiative transfer model (Vermote et al.). The 6S program is integrated into the CLAS processing stream and uses monthly averages of aerosol optical thickness (AOT) and water vapor (WV) values from the Moderate Resolution Imaging Spectrometer (MODIS) sensor onboard the NASA Terra spacecraft. Time-stamping of MODIS AOT and WV data with Landsat data is done on an automated basis (FIG. 3).

Sub-Pixel Analysis

The CLAS process relies upon the quantitative determination of fractional material cover at the sub-pixel scale (e.g., within each Landsat 30×30 m pixel). This core step employs a probabilistic spectral mixture sub-model that is run using the formulation shown in FIG. 4. This process spectrally decomposes each image pixel into fractional cover estimates (0-100% cover) of photosynthetic vegetation (PV) canopy, non-photosynthetic vegetation (NPV), and bare substrate. This sub-model is based on an algorithm developed for forest, savanna, woodland and shrubland ecosystems. It is fully automated and uses a Monte Carlo Unmixing (AutoMCU) approach to derive uncertainty estimates of the sub-pixel cover fraction values. The method uses three spectral endmember "bundles", derived from extensive field databases and satellite imagery, to decompose each image pixel using the following linear equation:

$$\rho(\lambda)_{pixel} = \Sigma [C_e \cdot \rho(\lambda)_e] + \epsilon = [C_{pv} \cdot \rho(\lambda)_{pv} + C_{npv} \cdot \rho(\lambda)_{npv} + C_{substrate} \cdot \rho(\lambda)_{substrate1}] + \epsilon \quad (1)$$

where $\rho(\lambda)_e$ is the reflectance of each land-cover endmember (e) at wavelength $\lambda$ and $\epsilon$ is an error term. Solving for the sub-pixel cover fractions ($C_e$) requires that the observations ($\rho(\lambda)_{pixel}$—in this case, Landsat ETM+ reflectance) contain sufficient spectral information to solve a set of linear equations, each of the form in equation (1) but at different wavelengths ($\lambda$).

Until recently, there were a limited number of spectral signatures of green and senescent vegetation and bare substrates for tropical regions. The mixture modeling technique requires spectral reflectance bundles ($\rho_{pv}(\lambda)$, $\rho_{npv}(\lambda)$, and $\rho_{substrate}(\lambda)$) that encompass the common variation in canopy and soil properties. Asner (1998) and Asner et al. (2003a, 2004a) collected these spectral data using full optical range field spectroradiometers (Analytical Spectral Devices, Inc., Boulder, Colo., USA) during field campaigns conducted from 1996 to 2000. The spectral endmember database encompasses the common variation in materials found throughout the Brazilian Amazon, with statistical variability well defined (2004a). The bare substrate spectra have been collected across a diverse range of soil types, surface organic matter levels, and moisture conditions. Spectral collections for NPV have included surface litter, senescent grasslands, and deforestation residues (slash) from a wide range of species and decomposition stages.

In contrast to the NPV and bare substrate spectra that can be collected via ground-based spectroscopic measurements, the photosynthetic vegetation (PV) spectra of forest species require overhead viewing conditions. This is very difficult in forest canopies with heights typically ranging from 10-50 m. Spectral measurements of individual leaves, stacks of foliage, or partial canopies (e.g., branches) introduce major errors in spectral mixture models and cannot be used (Asner, 1998). Therefore, canopy spectra were collected using the Earth Observing-1 (EO-1) Hyperion sensor, the first spaceborne hyperspectral sensor for environmental applications (Ungar et al.). The PV spectral bundle was derived from more than 40,000 spectral observations made at 30 m spatial resolution with Hyperion (images taken throughout 1999), atmospherically corrected to apparent top-of-canopy reflectance using the ACORN-4 atmospheric correction algorithm for hyperspectral data (ImSpec Inc., Palmdale, Calif. USA), and convolved to Landsat ETM+ optical channels (Asner et al., 2005). These green vegetation spectra thus inherently included the variable effects of intra- and inter-crown shadowing, which are prevalent in tropical forests (Gastellu-Etchegorry et al.). In Amazonia, shade fractions average 25% cover in humid tropical forests, but the variance is high with standard deviations of 12% or more (Asner et al., 2003b).

Figure 5:
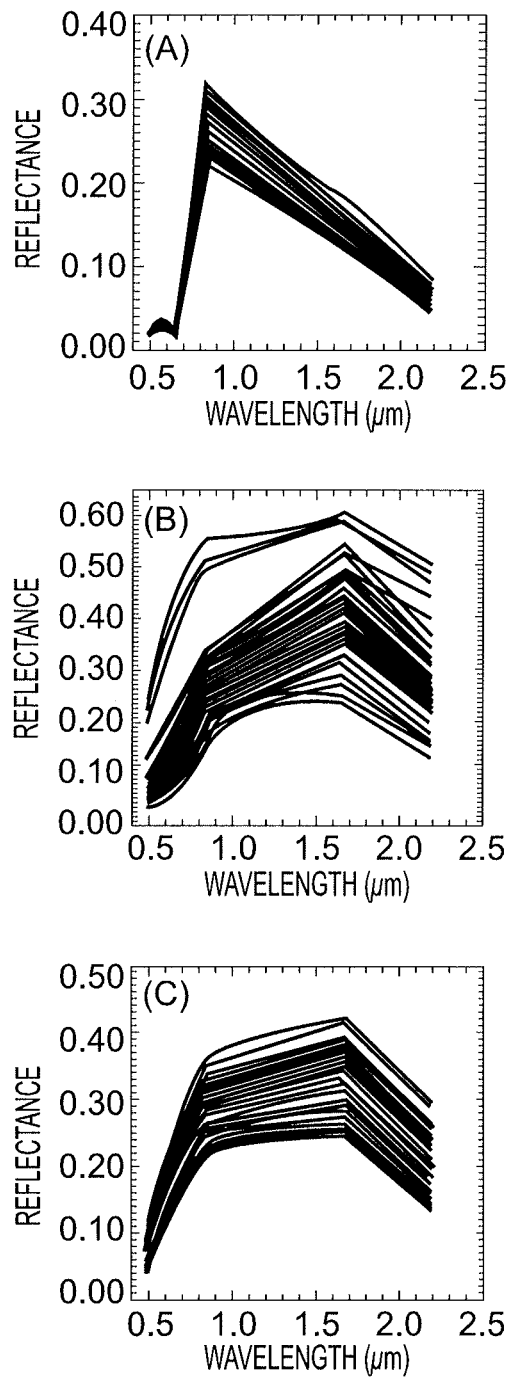
FIG. 5 depicts spectral endmember bundles used in the AutoMCU step of CLAS (from FIG. 3), which are (A) Photosynthetic vegetation, (B) Non-photosynthetic vegetation, and (C) soil. Adapted from Asner et al. (2004a).

It is thus critically important to note that the PV results include shade, which varies substantially with forest structure. Using a separate shade endmember is attractive (Souza et al., 2000), but doing so with multi-spectral Landsat data and such high shadow fraction variability often results in an under-determined spectral and mathematical problem in linear mixture models. That is, there are many viable solutions to the mixture modeling problem in forests. Imaging spectroscopy (hyperspectral) data are needed to solve this problem (Roberts et al., 1993). This issue was avoided by accepting the limitations of incorporating variable shade directly into the PV bundle derived from the EO-1 Hyperion sampling of undisturbed forest canopies in Brazil. The PV bundle includes spectra from mature forest, late-stage forest regrowth, and logged forest of at least five years post-harvest. In the end, the total number of spectra retained in the end-member bundles for the AutoMCU sub-model was 252, 611, and 434 for PV, NPV and bare substrate, respectively (FIG. 5). These spectra represent more than 130,000 field and spaceborne spectrometer observations collected over a five-year period of study (Asner et al., 2005).

Non-Forest Masking and Atmospheric Compensation

A series of automated masks were designed to exclude clouds, water bodies, cloud shadows, non-image and non-forest areas (e.g., pasture, urban and agriculture) from the CLAS processing stream (FIG. 3). Prior to execution of the AutoMCU sub-model, clouds are masked using the thermal channel (band 6) from the raw Landsat images. Asner et al. (2005) found that a thermal band threshold DN value of 125 can conservatively detect cloudy pixels over Amazonia. Water bodies are masked by finding pixels in the calibrated Landsat reflectance data in which bands 1-4 (blue, green, red, and near-infrared) have a negative slope. Only water displays such a negative reflectance slope with increasing wavelength. Non-image areas containing zero values are also masked.

Figure 4:
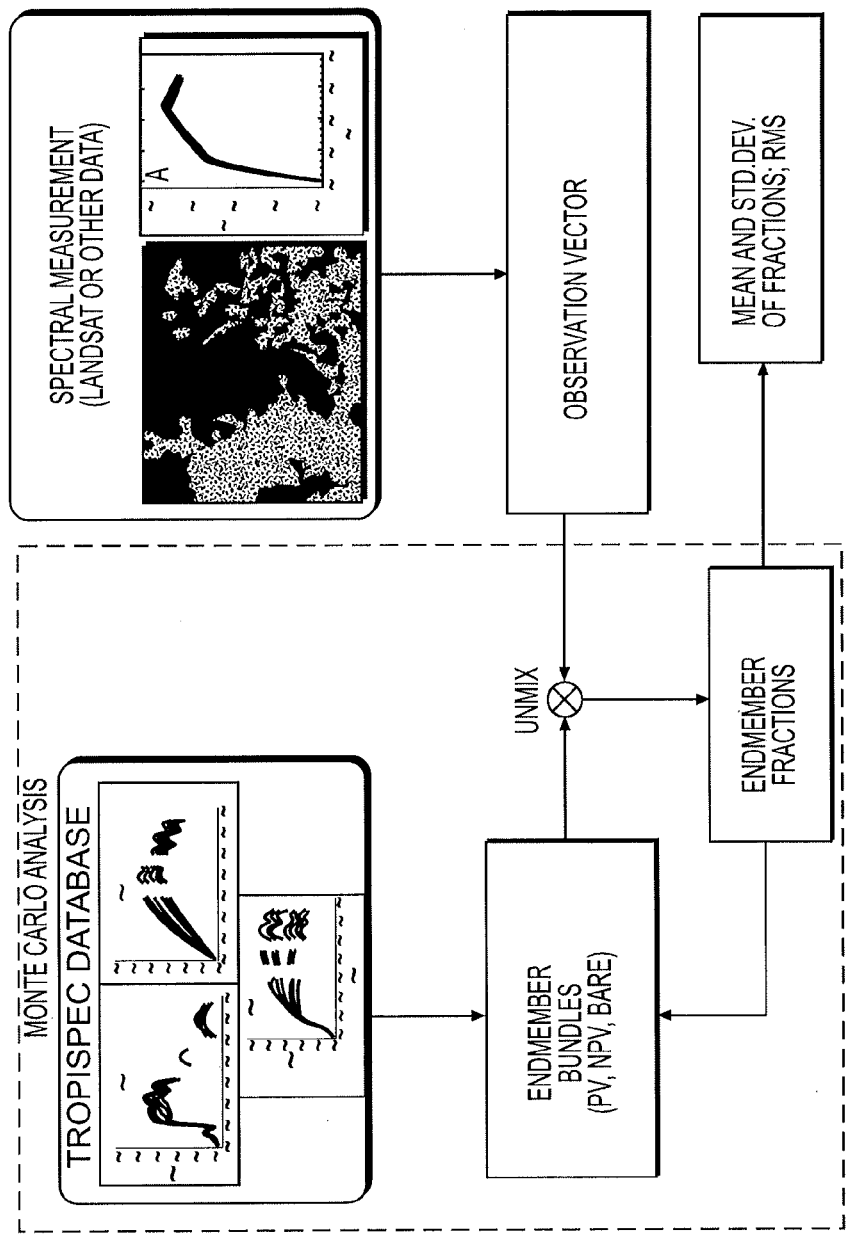
FIG. 4 depicts the AutoMCU sub-model within CLAS, showing that each satellite image pixel is a calibrated reflectance spectrum that is deconvolved into constituent fractional covers of photosynthetic vegetation (PV), non-photosynthetic vegetation (NPV), and soil. Spectral endmember libraries developed from extensive field and hyperspectral satellite studies (TropiSpec) (Asner et al., 2005) are in a probabilistic Monte Carlo unmixing approach to derive the percentage cover of PV, NPV and soil within each image pixel.
Figure 6:
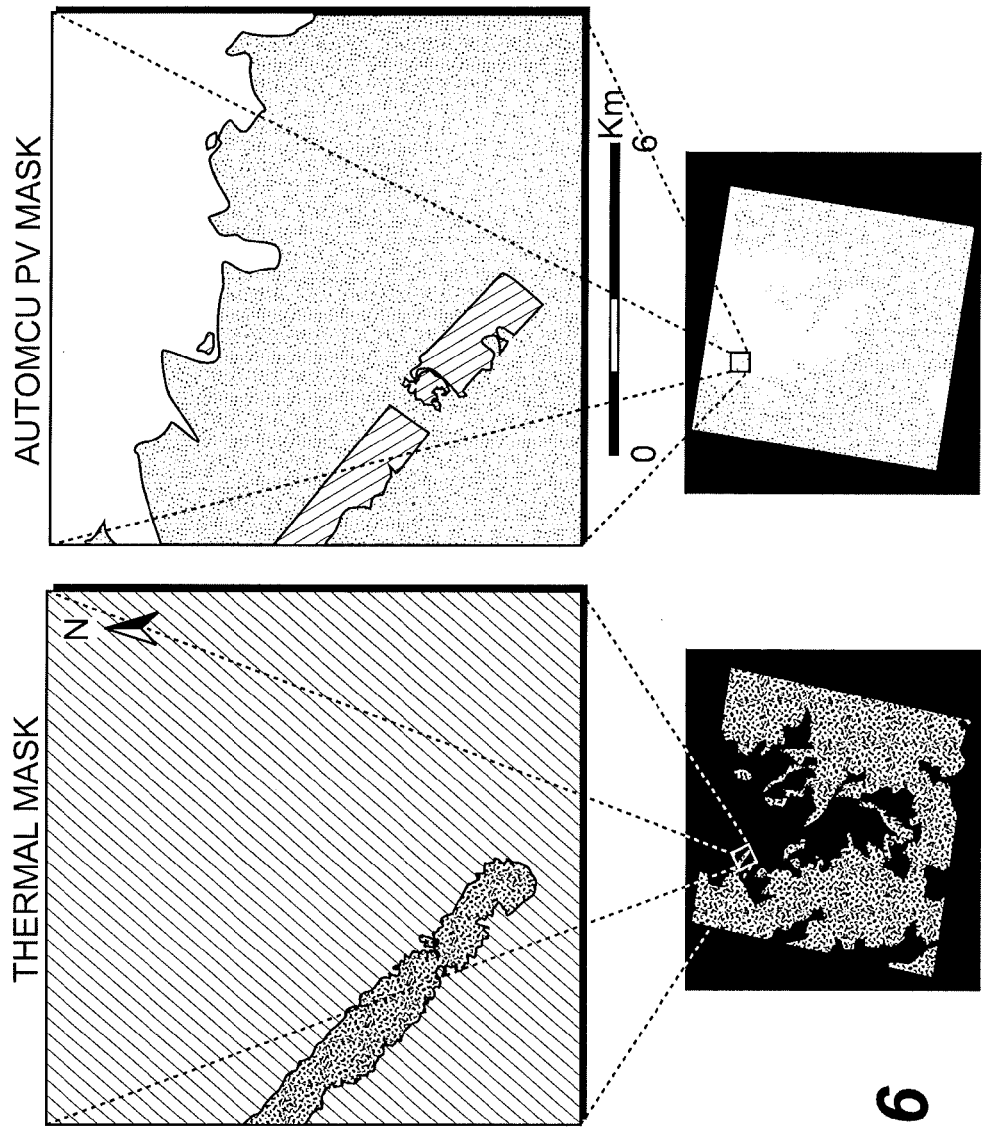
FIG. 6 depicts an example of deforestation and water body masking using Landsat thermal band 6 and the AutoMCU result for photosynthetic vegetation (PV).

Cloud shadows are identified using the root mean square error (RMSE) image that results from the AutoMCU processing (FIGS. 3-4). Areas shadowed by clouds have large RMSE values and are masked by identifying pixels above a specific RMSE threshold (Asner et al., 2005). To limit the logging analysis to forested areas, Landsat thermal band 6, combined with the AutoMCU results, is used to identify pixels containing primarily forest and non-forest areas. Forests have a lower brightness temperature and a higher PV fractional cover than deforested lands. A conservative PV fractional cover threshold of 60% was employed to delineate forest cover in the PV mask. The minimum and maximum thermal thresholds, which encompass forested areas in the thermal mask, are dynamically generated for each image by calculating the mean thermal value of all pixels having a PV fraction cover greater than 80% and then masking all pixels with values >15 digital numbers (DN) from the mean thermal value. These final masking steps have the added feature of removing residual clouds and cloud shadows that were missed in the masks applied earlier in the CLAS process (FIG. 6).

Although atmospheric correction was performed on the raw imagery before processing through the AutoMCU sub-model, residual atmospheric effects can persist (Asner et al., 2005). These residual effects exist spatially within a scene and temporally between scenes. These effects were greatly reduced prior to automated logging detection (next section) by calculating the average change in fractional forest cover in 55 km$^2$ subsets of the imagery. These large geographic subsets are made at a spatial scale far greater than that of the most extensive logging activities, so temporal differences in the overall forest fractional cover at this scale are a result of atmospheric effects (e.g., haze) or forest phenology. These false fractional cover changes are normalized by adjusting the background forest temporal variation to zero. Since disturbances related to logging or other anthropogenic activities occur at a much smaller spatial scale than is considered in this processing step, normalization of the forest values across large areas does not affect the CLAS process in discriminating true disturbances from the surrounding forested areas.

Pattern Recognition

The specific criteria used in this procedure were determined following a comprehensive analysis and review of the forest responses to logging at various intensities in the Brazilian states of Path, Mato Grosso and Acre where field studies were conducted. The mean and standard deviation fractional cover images from the AutoMCU step in CLAS provide quantitative data on canopy damage and forest disturbance intensity from which selectively logged areas can be determined (FIG. 3). By identifying areas of canopy disturbance that are arranged in specific spatial patterns, it is possible to detect logged areas on an automated basis. The primary method by which logging is detected is image differencing, where pairs of AutoMCU sub-pixel fractional cover images, separated by approximately one year, are used to create images of PV (forest canopy) and NPV (surface woody and senescent vegetation material) change that indicate areas of relative canopy disturbance or recovery. Forest disturbances in these images always have reductions in PV, simultaneous with increases in NPV fractional cover.

Logging activity results in low intensity forest disturbances from tree felling gaps, moderate intensity linear features from skid trails along which felled trees are dragged by tractors or skidders, and high intensity points of damage called log decks where logs are loaded onto trucks for transportation. The log decks are connected by logging roads, seen as linear features causing large reductions in the fractional cover of PV, to local roads or rivers for transportation to markets. These patterns are unique to logging throughout most of the Amazon, and thus they serve as the basis upon which the method for logging detection functions. CLAS identifies points (e.g., treefall gaps and log decks) and linear features (e.g., skid trails and logging roads) of recent disturbance occurring in forested areas. As these features also exist at a lower frequency in intact forest regions, their spatial density and diversity (see definition in next section) are calculated to identify those areas having disturbances in patterns most indicative of logging activity. The procedure then identifies these areas for further analysis by creating point maps, termed logging nodes, indicating their locations.

Log decks are automatically detected by searching for pixels where PV decreases significantly in a 30 m pixel centered on a 7×7 pixel kernel (4.41 ha). A positive detection is flagged when pixels with large PV reduction are surrounded by three concentric rings of incrementally greater PV cover surrounding the target pixel. This indicates an increase in canopy damage with greater proximity to the log deck, a pattern consistent with most logging activities.

Figure 7:
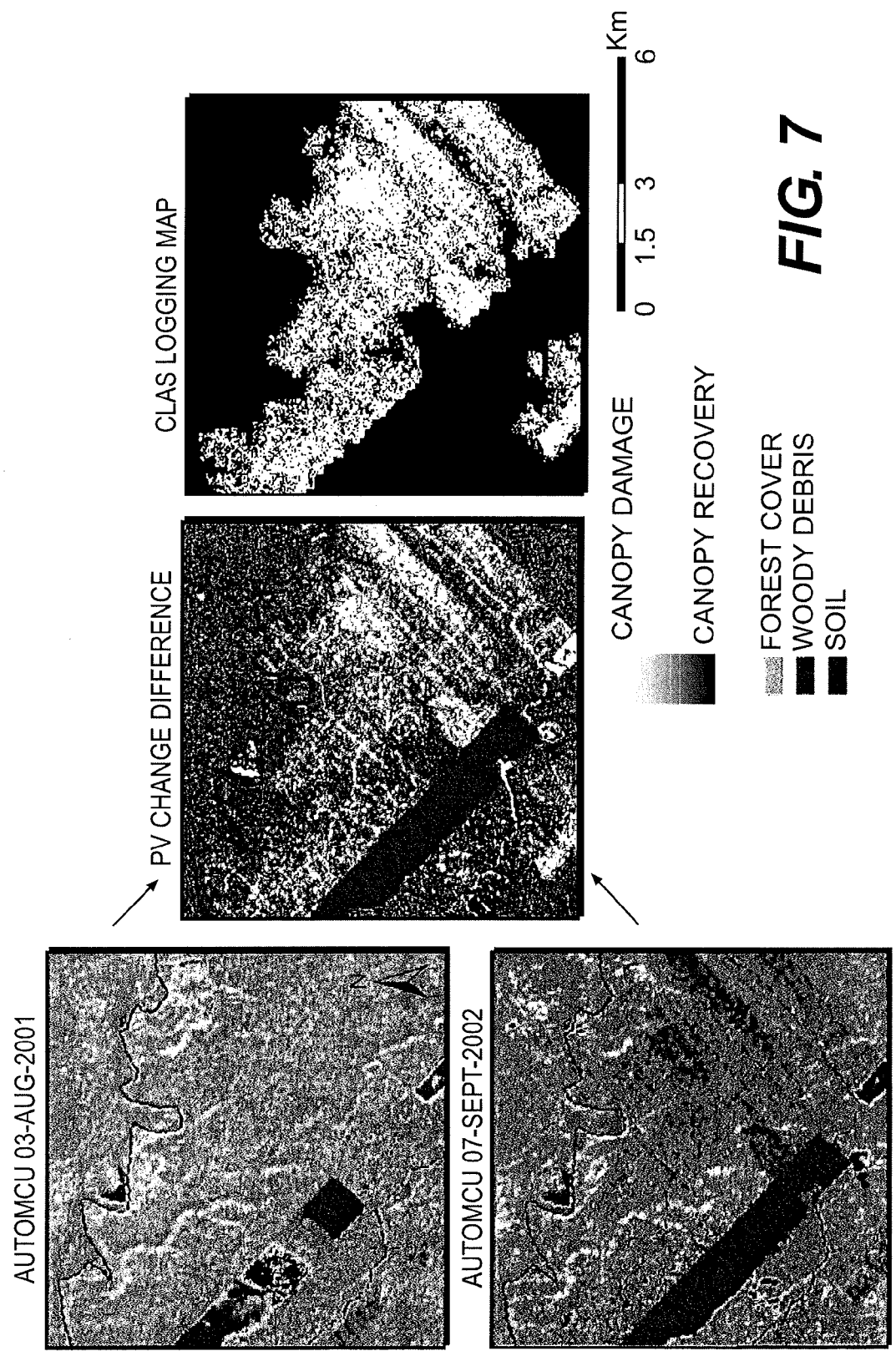
FIG. 7 depicts an example of logging detection using CLAS. AutoMCU results from one year are differenced against those of the next year. A directional pattern recognition algorithm then uses the PV-change image to locate probable logging decks, skids, and roads.

The strategy for detecting decks works well in areas logged at higher intensities, as the decks tend to be abundant and equally spaced. However, in areas where the logging is more haphazard, where the forest damage is extremely high or low, or where the roads themselves also function as loading zones, individual log decks are not always distinguishable. Skids trails are a typological feature of selective logging practices, and they are the single-most ubiquitous surface feature found in harvested areas (Pereira et al., 2002; Asner et al., 2004). The presence of skid trails is quantifiable based on large decreases in PV fractional cover in linear or near-linear patterns (Asner et al., 2004a). To detect the concentration of skid trails and auxiliary roads, a moving 6×6 pixel (3.24 ha) kernel is applied to the PV change image to enhance linear features in the N-S, E-W, NE-SW, and NW-SE directions (FIG. 3). The number of directions in which the linear features are arranged (which are defined herein as their diversity), and their spatial density, in conjunction with the presence or absence of logging decks, is calculated for each location. With this information, it is possible to automatically distinguish probable logging events. In general, areas of greater logging intensity have a roughly equal proportion and higher density of linear features with the presence of logging decks. Lower intensity areas are normally dominated by one direction of linear feature and have few or no logging decks. An example of a typical logging detection is shown in FIG. 7.

Final Integration

After the linear and logging deck pattern recognition steps are completed, CLAS automatically integrates the various results to identify contiguous pixel clusters of probable logging activity. This process starts by creating a list of the logging nodes that are identified in the previous steps. Logged areas are identified using a moving kernel approach. A base kernel of 7×7 pixels (4.41 ha) and four 3×3 pixel (0.81 ha) subset kernels, one located at each corner of the base kernel, are used. The base kernel begins at each logging node and tests the criteria described below. If the area in question tests positive, the analysis kernel is moved to its 7×7 pixel neighbors to the north, south, east, and west, which are then each tested against the criteria (FIG. 3). This iterative process continues until all neighbors have been evaluated or the maximum logged cluster size (maximum of 17 positive detections per logging node) has been reached. The input layers and specific criteria tested within the base and subset kernels are described below. For the criteria below, all units for PV and NPV are % fractional cover within a pixel; units for PV CI and NPV CI are % change in cover fractions between image dates.

Input Layers to Logged Area Detection Procedure:
Logging node map
Thermal RMS mask (dynamically generated in earlier procedure) (T-mask)
PV mask (>60% fractional cover) (PV-mask)
PV change difference image (PV CI)
NPV change difference image (NPV CI)
After image PV (AI PV)

Base Kernel Criteria:
75% good data pixels (not cloud, cloud shadow, or water)
Non-forested area <0.54 ha (12.2%); based on T- and PV-masks.
60%<Mean AI PV>93%
Mean PV CI>−9%
Mean NPV CI<2%
Mean PV CI standard deviation >33%
Mean NPV CI standard deviation >46%
More than 6 pixels (0.54 ha) with PV CI values >80%
More than 6 pixels (0.54 ha) with NPV CI values <−85%
Masked area <0.18 ha Subset Kernel Criteria:
≧2 subsets with PV CI ≧32% standard deviation
≧2 subsets with mean PV CI≦3% and ≧60%
≧2 subsets having ≧1 pixel (0.09 ha) with a PV CI value ≧80%
≧2 subsets with NPV CI≧46% standard deviation
≧2 subsets with mean NPV CI≦−5% and ≧−65%
≧2 subsets having ≧1 pixel (0.09 ha) with a NPV CI value ≦−85%

Manual Audit

Maps of probable logging events were visually audited to verify whether an area is being logged or not, in accordance with criteria established for identification of logged areas (see criteria below). In this process, false positives and negatives were manually removed and added. In this Amazon study, two analysts were employed during the audit, and their results and uncertainties were monitored and compared.

The audit logging criteria are divided into high- and low-damage obvious and non-obvious categories. These categories encompassed all probable logging events in the study area and were identified after extensive review of logging events identified in the field. The criteria applied in each category are listed below.

High-Damage Obvious Criteria
Abundance of logging decks
Obvious linear features (including primary-tertiary access roads and skid trails)
Severe canopy damage visible in PV change difference image
Areal extent normally ≧1 ha
Evidence of logging from previous years in close proximity (<−15% PV change difference image)

High-Damage Non-Obvious Criteria
Few to no logging decks
Few to no linear features
Severe canopy damage visible in PV change difference image (>15%)
Presence of access roads or rivers, if not adjacent to a anthropogenic non-forest areas
Areal extent normally ≧1 ha
Evidence of logging from previous years in close proximity (<−15% in PV change difference image)

Low-Damage Obvious Criteria
Few to no logging decks
Obvious linear features
Presence of access roads or rivers
Often tree-like in formation (graduating from higher to lower damage linear features)
Not a linear feature connecting non-forest areas, or otherwise used for general transportation
Often encompassing large extents
Evidence of logging from previous years in close proximity (<−15% PV change difference image)

Low-Damage Non-Obvious Criteria
Few to no logging decks
Few to no linear features
Close proximity to access (i.e. roads, rivers or anthropogenic non-forest areas)
Speckles of recent canopy damage (felling gaps; >15%) in PV change difference image occurring at a density greater than in the surrounding forest areas
Areal extent normally <6.5 ha
Evidence of logging from previous years in close proximity (<−15% in PV change difference image)

Variation in the final logging products may result from differences in observer application of the manual audit procedure. The error associated with these user-specific differences was tested by randomly selecting 25 subsets (400×400 pixels=144 km²) of the logging results throughout the Amazon study area. These areas were then manually audited by two separate observers—one with in-depth experience with the auditing procedure, and one with no experience whatsoever. Paired t-tests were then used to assess differences in the final auditing results. This test showed no statistical difference between auditors (p=0.21). As a result, it is concluded that the auditing step used herein—the only significant non-automated step in the CLAS processing stream—is not sensitive to user biases.

Annualization

To determine the total amount of logging within a Brazilian state for a given year interval, it is necessary to account for the seasonality of logging operations during the year. Since the Landsat ETM+ images are selected based on lowest possible cloud cover, the time interval for which the logging activity is identified in the pair of images is not exactly one year, and so may contain more or less than one year of logging. Therefore, a time period was defined to which annual logging estimates must be standardized. The annualization methodology used by the Monitoring the Brazilian Amazon Gross Deforestation Project (PRODES) was adopted. Assuming that logging, like deforestation, occurs during the dry season, the annual logging rate was determined by prorating the amount of logged area to a complete dry season. This standardization depends upon the onset and length of the dry season for each image, based the geographic location of the scene center. The general spatial pattern of the Amazon dry season was provided by Marengo et al. (2001), based on the daily amount of outgoing longwave radiation.

Geographic Coverage

Figure 8:
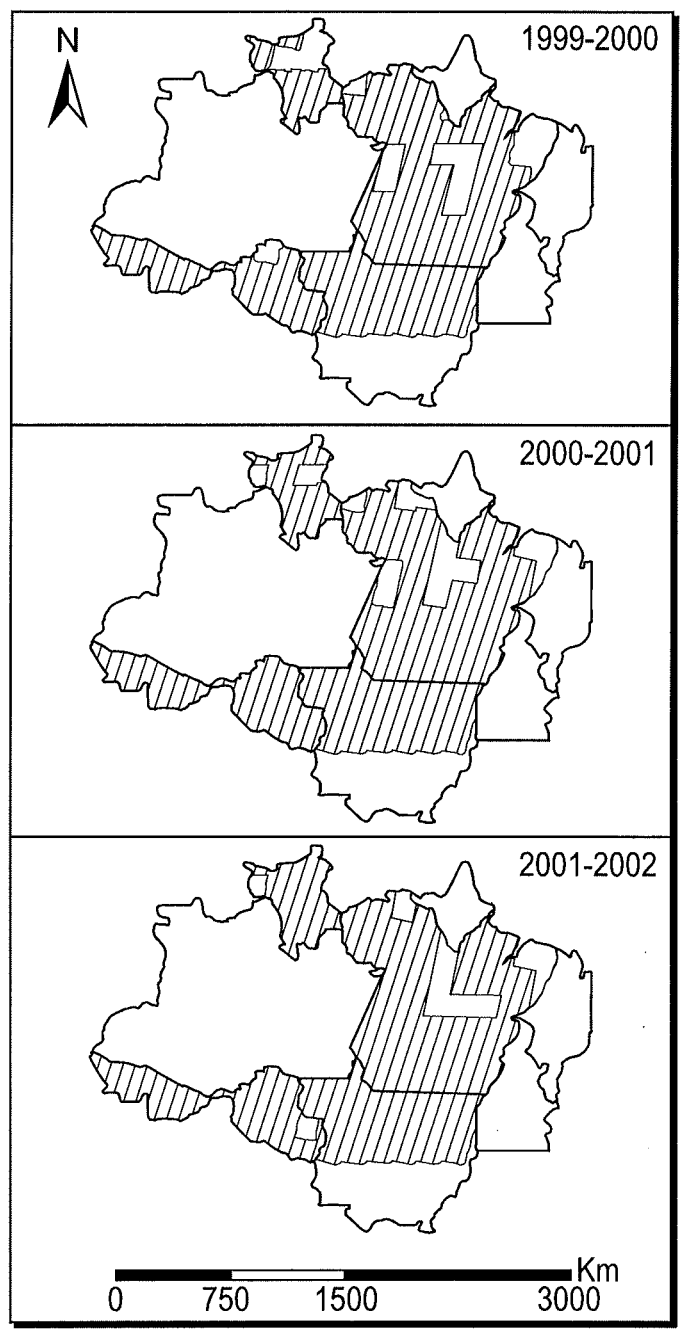
FIG. 8 depicts a geographic coverage of study, showing the Brazilian Legal Amazon with Landsat 7 satellite footprints.

The Brazilian Amazon basin covers an area of approximately 4.1 million km². Analysis of the entire region with Landsat Enhanced Thematic Mapper-Plus (ETM+) imagery would require approximately 220 scenes per year or 880 images for the years 1999-2002, yet much of the northwestern Amazon still contains relatively little deforestation and logging (Nepstad et al., 1999). Therefore, the study was limited to the States of Acre, Pará, Mato Grosso (northern 58% of the state containing most of the forested area), Rondônia, and Roraima (FIG. 8). These five states contain ~90% of the deforestation reported by Brazil for all of the Legal Amazon, and thus are the most important areas for logging studies today. This strategy reduced the number of required Landsat images to 480 scenes.

Figure 9:
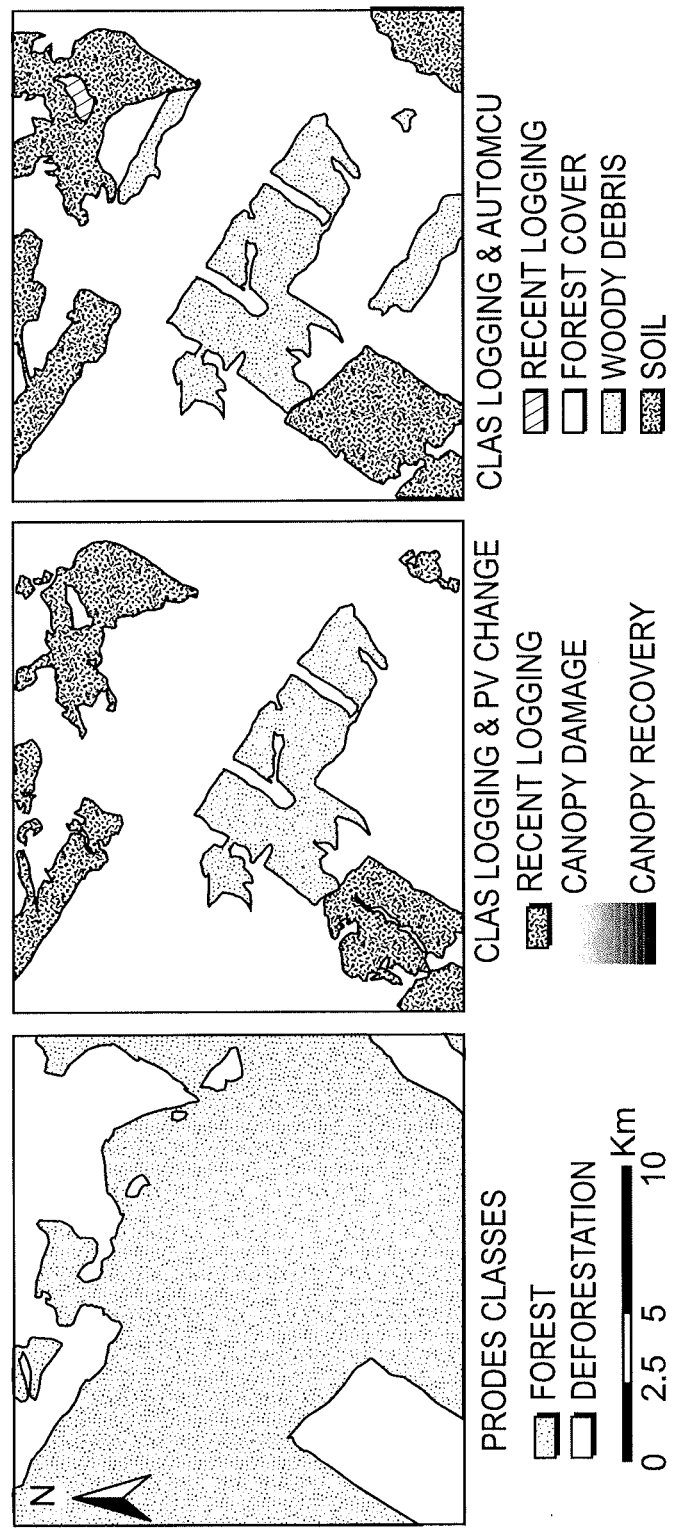
FIG. 9 depicts an example showing how the CLAS logging product is unique from the PRODES deforestation products provided by the Brazilian Space Research Institute.
Figure 10:
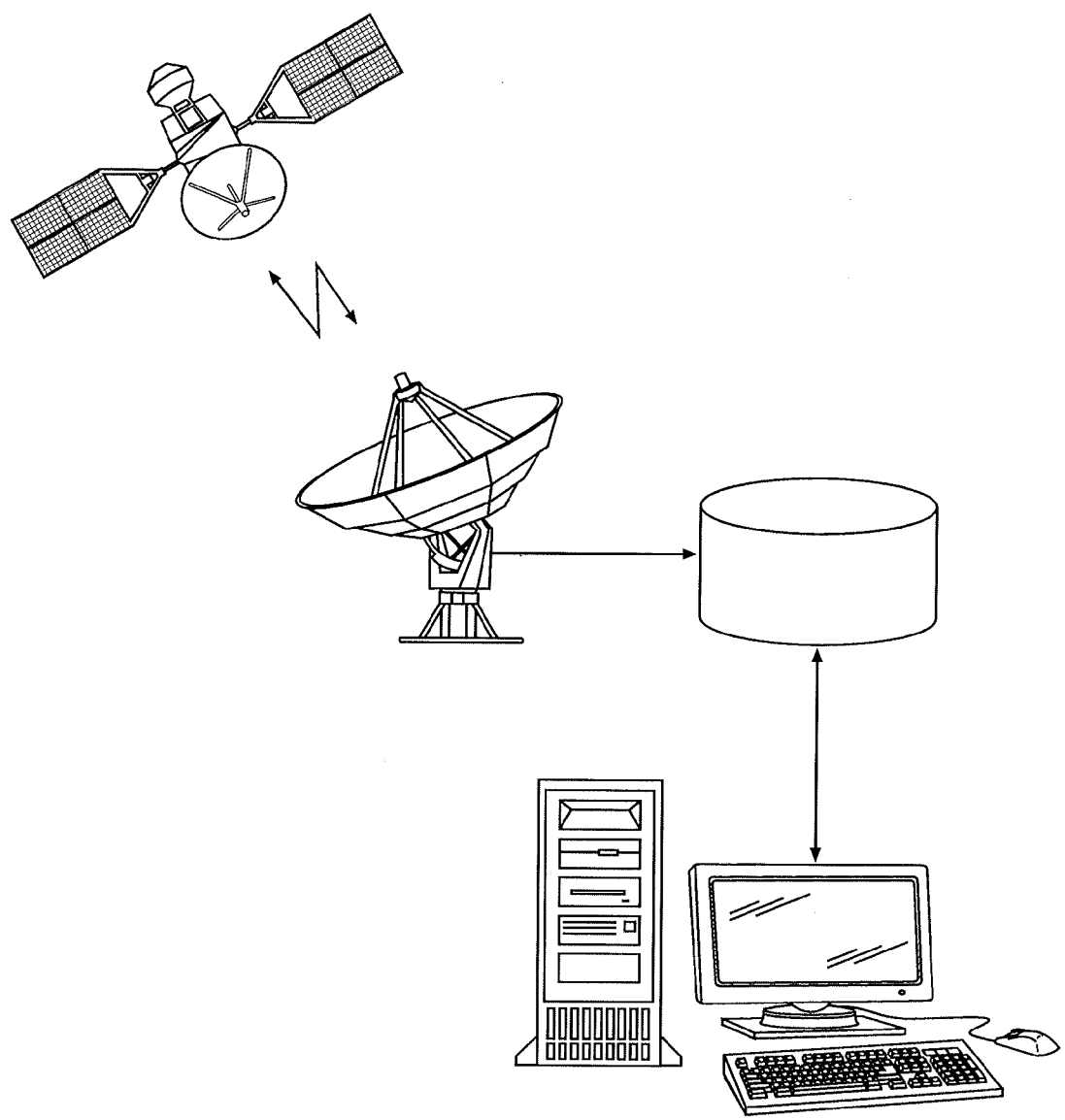
FIG. 10 depicts a block diagram of the CLAS system.

The geographic overlap was evaluated between the Brazilian Space Research Institute's deforestation maps and the CLAS logging maps for all Landsat images used in the study. An example of this comparison is shown in FIG. 9. It was found that the logging detections overlapped with PRODES deforestation maps only 6% (±5%) of the time in any given year. Up to three years following harvest, a maximum of 19% (±11%) of logged areas were subsequently deforested (clear cut). Therefore, these results are not redundant with deforestation and thus represent forest damage that has been unaccounted for in previous State- and Basin-scale forest disturbance estimates.

The study covered the period 1999 to 2002, which is prior to the failure of the Scan Line Corrector (SLC) in the ETM+ instrument onboard Landsat 7. Following the SLC failure, roughly 40% of each acquired Landsat image is missing data. To seek out alternatives to Landsat 7, a satellite inter-comparison of logging detection capability based on the network of low- and high-intensity logging sites in Amazonia was conducted (Asner et al., 2004). Comparisons were made among the detection capabilities of hyperspectral (EO-1 Hyperion), multi-view angle (Terra-MISR), high spatial resolution multi-spectral (EO-1 Advanced Land Imager, Landsat 5 Thematic Mapper, Landsat 7 ETM+, CBERS-2, SPOT, Terra-ASTER-VNIR), and low spatial resolution multi-spectral (Terra-MODIS, AVHRR) data. The only sensor to meet or exceed the performance of Landsat ETM+ was EO-1 Hyperion; all others failed to detect at least 80% of the logging damage in the field sites. However, EO-1 Hyperion is a hyperspectral technology demonstration with extremely limited spatial and temporal coverage, making its application to large-area analysis intractable. It was concluded that the combination of spectral resolution (6 optical channels), spectral signal-to-noise performance, and spatial resolution was critically important in determining the amount of logging that could be reliably detected. Landsat 7 ETM+ provides the minimum performance needed for reliable analysis of selective logging in Amazon forests, and improved space-based technology is critically needed to remedy the current limitations.

Unobserved Areas

In some cases, there is a lack of sufficiently cloud-free imagery to determine logging extent using the pattern recognition portion of CLAS. For example, cloud cover precluded the use of two image pairs (Landsat path-row 222/062 and 226/062) in the state of Pará, one in 1999 and the other in 2000. To estimate logging in these areas, it was necessary to employ the single-scene analysis approach detailed by Asner et al. (2004a), which demonstrated that manual interpretation of single-date AutoMCU results have a temporal sensitivity of about one year following logging. Therefore, the extent of new logging in these two Pará images as a proxy for annual logging rates in these regions was estimated.

In other cases, persistent cloud cover resulted in no images for certain areas for certain years. In these instances, the amount of logging for the area was estimated from Landsat observations made in the closest year. Of the 480 Landsat images employed throughout the entire study, this was necessary 10.5% of the scenes.

Uncertainty Analyses

Any large-scale, complex remote sensing study must track and manage sources of uncertainty in the final results. This is important because there are many steps that can lead to errors. The uncertainty was carefully quantified in four key areas: (i) atmospheric correction (aerosol and water vapor), (ii) unobserved areas caused by persistent cloud cover, (iii) annualization, and (iv) auditor uncertainty.

Atmospheric Uncertainty

In the CLAS processing stream, Landsat ETM+ images are atmospherically corrected using the 6S atmospheric correction algorithm (Vermote, 1997), with monthly averages of aerosol and water vapor inputs from the MODIS satellite sensor. The sensitivity of the CLAS AutoMCU algorithm to atmospheric correction errors was comprehensively assessed by Asner et al. (2005), and was found to be minimally sensitive to uncertainties in aerosol and water vapor from MODIS. To further understand the effect that the atmospheric correction has on the sensitivity of entire CLAS process, five Landsat image pairs were atmospherically corrected using randomly-selected, monthly aerosol and water vapor values from MODIS. The difference in the amount of automatically detected logging between the different atmospherically-corrected images was only 0.7% (Table 2).

TABLE 2

Primary sources of uncertainty in CLAS analyses of selective logging extent in forests of Amazonia.

| Source | Percentage of Total Logged Area | Method |
|---|---|---|
| Atmosphere | ±0.7% | Difference in automatically detected logged area between the atmospherically corrected image and an image with randomly selected atmospheric characteristics. |
| Unobserved Area | +5% | Percentage of cloud- and shadow-covered area compared to total logged area |
| Annualization | ±2-9% | Standard error of the difference between dry season length for matched pairs of consecutive years from 1979-1996. |
| Auditor | ±12.8% | Standard error of difference between auditor estimates, on a per km² of logging basis |
| TOTAL ESTIMATED ERROR | ±11-14% | Root mean square error |

Unobserved Area Uncertainly

When cloud and cloud-shadow cover is greater than 50% in any 5,625 km2 area (2,500×2,500 pixels), the area of observed logging is used to estimate the amount of logging in the unobserved, cloudy areas. The sensitivity to this type of error was assessed by simply quantifying the fractional cover of clouds and cloud shadows in comparison to observed logging extent. The calculated absolute uncertainty caused by this step was approximately +5% over the five states (Table 2).

Annualization Uncertainty

Although the rate of logging is assumed constant throughout the dry season, there is a level of uncertainty inherent in this assumption. Marengo et al. reported rainy season length for five regions of the Amazon (i.e., North Amazonia, Central Amazonia, Mouth of Amazon, Southeast Amazonia, and Southwest Amazonia) for the period 1979-1996. To determine the uncertainty in the logging estimate related to assumption of dry season length, a series of matched pairs of dry season length for two consecutive years (e.g., 1979-1980, 1980-1981, 1995-1996) was compiled to calculate the standard error of the difference in dry season length for each region. This standard error (in days) was divided by the average length of the dry season for the respective region to express the uncertainty in percent of dry season. This percentage uncertainty was then applied to actual satellite image pairs or by averaging the uncertainty for states located between two regions. These uncertainties ranged from 2-9% as a result of interannual variation in dry season length (Table 2).

To further assess the sensitivity of the logging area estimates to the annualization and timing of the dry season, the estimates were also annualized without the constraint that logging activity only occurs only during the dry season. These results are reported in Table 3, with comparison to the preferred results that appear in the main text (Table 2). It is clear that the differences between these two assumptions can be large in the smaller states (e.g., Acre, Rondonia), where the estimate of logged areas is more sensitive to the acquisition dates of a smaller number of annual satellite image pairs. However, in the larger states, these uncertainties tend to balance out. In the majority of cases, the amounts of logging estimated without the dry season constraint still falls within the minimum and maximum limits of estimated logged area caused by other sources of uncertainty (discussed below).

TABLE 3

Logging estimates for Brazilian states in the Amazon using the dry-season annualization protocol from INPE (Marengo et al., 2001) and a calendar-year annualization.

| State | 1999-2000 rates ($km^2 yr^{-1}$) | | 2000-2001 rates ($km^2 yr^{-1}$) | | 2001-2002 rates ($km^2 yr^{-1}$) | |
|---|---|---|---|---|---|---|
| | Dry-season Protocol | Calendar Year | Dry-season Protocol | Calendar Year | Dry-season Protocol | Calendar Year |
| Acre | 64 | 91 | 53 | 48 | 111 | 117 |
| Mato Grosso | 13,843 | 11,762 | 7,912 | 7,783 | 7,267 | 7,182 |
| Pará | 5,939 | 5,030 | 5,343 | 5,159 | 3,791 | 3,751 |
| Rondônia | 773 | 694 | 923 | 902 | 946 | 638 |
| Roraima | 32 | 32 | 55 | 55 | 20 | 20 |
| TOTAL | 20,651 | 17,609 | 14,286 | 13,947 | 12,135 | 11,708 |

Auditor Uncertainty

Each auditor reviewed a set of the same 25 image subsets (400 by 400 pixels) in which most images include some form of logging. A test was performed in which a novice and an experienced image analyst manually delineated areas containing logged forest. This comparison was used to calculate one standard error of the difference in logging assessments between auditors for each image subset. The standard error between auditors was 0.69 $km^2$ of logging, which when scaled by the average amount of logging identified by the two analysts (5.4 $km^2$), resulted in an uncertainty of 12.8% (Table 2).

These different sources of uncertainty were compiled and used to estimate an overall uncertainty in the logging extent estimates of 11-14% for each Brazilian state in each year of analysis (Table 2). These uncertainties were then propagated to the Basin scale for annual estimates of selective logging for the years 2000, 2001, and 2002 (Table 4).

TABLE 4

Minimum-maximum logging estimates for Brazilian states in the Amazon based on uncertainties in CLAS logging methodology.

| State | 1999-2000 rates ($km^2 yr^{-1}$) Logged | | 2000-01 rates ($km^1 yr^{-1}$) Logged | | 2001-02 rates ($km^2 yr^{-1}$) Logged | |
|---|---|---|---|---|---|---|
| | Minimum* | Maximum† | Minimum* | Maximum† | Minimum* | Maximum† |
| Acre | 54 | 78 | 45 | 66 | 94 | 133 |
| Mato Grosso‡ | 11,801 | 16,521 | 6,744 | 9,481 | 6,195 | 8,453 |
| Pará | 4,905 | 7,419 | 4,421 | 6,536 | 3,138 | 4,844 |
| Rondônia | 657 | 931 | 785 | 1,076 | 804 | 1,113 |
| Roraima | 27 | 38 | 46 | 66 | 17 | 26 |
| Total | 17,444 | 24,987 | 12,041 | 17,225 | 10,248 | 14,569 |

*Composed of atmospheric, temporal interpolation, annualization, and auditor uncertainties (see text for definitions).
†Includes all uncertainties plus cloud interpolated area.
‡Includes Northern Mato Grosso only.

Validation

A comprehensive validation study of the logging extent results derived from the CLAS processing stream was carried out. Previous validation studies were highly detailed (tree-by-tree level) damage assessments, but were limited to fewer logging sites and only to the AutoMCU portion of the process (Asner et al., 2004a). Pereira et al., Asner et al. (2002b, 2004b), and Keller et al. (2004b) carried out extensive field studies from 1997-2002 in logging areas subjected to a wide range of harvest methods, intensities, and canopy damage levels. These studies included the development of high-resolution global positioning system (GPS) coverages of logging extent in conventional and reduced-impact logging sites in eastern Pará, central Pará, and northern Mato Grosso. These areas contained the most intensive and widespread logging in the entire study.

There were a total of 45 harvest/image combinations available for this validation study. The images areas were only considered where the harvest blocks were free of clouds and whose harvest month was known when that knowledge was essential. All logging events were contained in three Landsat images: Fazenda Cauaxi in eastern Pará (Landsat path/row 223/063); Tapajós National Forest in central Pará (path/row 227/062); and Juruena in northern Mato Grosso (path/row 229/067). The timber harvest dates of areas contained within these images ranged from 1997 to 2002 (Table 5). About half of the logging sites were harvested using conventional (high-damage) techniques, and the other half employed reduced-impact (low-damage) logging methods (Asner et al., 2004b). Logging areas ranged in size from 11 to 1,079 ha. This wide range of logging block sizes and canopy damage levels provided a substantial geographic data set against which to test CLAS.

TABLE 5

Validation of CLAS logging detection method.

| Logging Block | Harvest Type | Image Date | Harvest Date | % Logging Detected |
|---|---|---|---|---|
| Harvests more than 12 months prior to satellite imaging or after satellite imaging ||||||
| Cauaxi | CL | 2000 | 1996 | 0 |
| Cauaxi | RIL | 2000 | 1996 | 0 |
| Cauaxi | RIL | 2000 | 1998 | 0 |
| Cauaxi | CL | 2000 | 1998 | 13 |
| Cauaxi | CL | 2000 | 2000 | 14 |
| Juruena | CL | 2000 | 1998 | 0 |
| Juruena | CL | 2000 | 1999 | 5 |
| Juruena | CL | 2000 | 2001 | 16 |
| Juruena | RIL | 2000 | 2002 | 9 |
| Tapajós | RIL | 2000 | 1997 | 0 |
| Tapajós | RIL | 2000 | 2002 | 0 |
| Tapajós | RIL | 2000 | 2000 | 8 |
| Juruena | RIL | 2001 | 2002 | 1 |
| Tapajós | RIL | 2001 | 2002 | 0 |
| Cauaxi | CL | 2001 | 1996 | 0 |
| Cauaxi | RIL | 2001 | 1996 | 0 |
| Cauaxi | RIL | 2001 | 1998 | 0 |
| Cauaxi | CL | 2001 | 1999 | 0 |
| Cauaxi | RIL | 2001 | 1999 | 0 |
| Cauaxi | CL | 2001 | 1998 | 4 |
| Juruena | CL | 2001 | 1998 | 0 |
| Juruena | CL | 2001 | 1999 | 38 |
| Tapajós | RIL | 2001 | 1997 | 0 |
| Tapajós | RIL | 2001 | 1999 | 0 |
| Tapajós | RIL | 2001 | 2000 | 0 |
| Cauaxi | CL | 2002 | 1996 | 0 |
| Cauaxi | RIL | 2002 | 1996 | 0 |
| Cauaxi | RIL | 2002 | 1998 | 0 |
| Cauaxi | CL | 2002 | 1999 | 0 |
| Cauaxi | RIL | 2002 | 1999 | 6 |
| Cauaxi | RIL | 2002 | 2000 | 8 |
| Cauaxi | CL | 2002 | 1998 | 0 |
| Cauaxi | CL | 2002 | 2000 | 34 |
| Juruena | CL | 2002 | 1998 | 0 |
| Juruena | CL | 2002 | 1999 | 0 |
| Juruena | RIL | 2002 | 2000 | 0 |
| Tapajós | RIL | 2002 | 1999 | 0 |
| Tapajós | RIL | 2002 | 2000 | 0 |
| Tapajós | RIL | 2002 | 2000 | 16 |
| Harvests less than 12 months prior to satellite imaging ||||||
| Cauaxi | CL | 2000 | 1999 | 75 |
| Cauaxi | RIL | 2000 | 1999 | 59 |
| Tapajós | RIL | 2000 | 1999 | 91 |
| Tapajós | RIL | 2000 | 2000 | 84 |
| Cauaxi | CL | 2001 | 2000 | 44 |
| Tapajós | RIL | 2002 | 2002 | 36 |

Geographic information system (GIS) coverages of the logging areas listed in Table 5 were overlaid on the CLAS products, and statistical data on logging detection percentage area and logging type were calculated. Results were organized by success or failure in detecting the logged areas and their spatial extent. For analysis purposes, a false-negative detection was declared when CLAS missed areas logged in the 12 months prior to image date. A false-positive detection was declared for areas not logged in the 12 months prior to image date and when more than 25% of the false area was detected as logging. The 12-month limit, a result of the acquisition dates of the before and after AutoMCU images used in the change differencing process, was selected based on the known sensitivity of the AutoMCU algorithm within CLAS (S3).

Of the 45 image combinations tested, only two false-positives and two false-negatives occurred (Table 5). For the two false-positives, the detected logging areas ranged from 34-38% of the true area and were logging blocks that had been harvested two years prior to satellite imaging. Therefore, it is considered that these two blocks as false-positives only in the sense that it was not intended for CLAS to find logging sites that are more than a year old. Further review of the false-positive from Cauaxi pointed to issues of geo-registration of exact harvest boundaries between the GIS and the imagery. The other false-positive (Juruena) was very clearly re-harvested over roughly 40-50% of the originally delineated logging block (which had been harvested three years prior to re-harvest), hence it was not considered further. For the two false-negatives, the detected logging areas ranged from 36-44% of the true area. Further review of the false-negative from Cauaxi also revealed co-registration problems between field data and remote sensing imagery. The other false-negative (Tapajós) occurred in a large block where the harvesting took place for several months, which caused the first harvested portions to be too old (14 months) for detection due to regrowth.

A chi-square test of the results in Table 4 shows that there is a highly significant association between logging and CLAS algorithm detection ($\lambda^2=17.0>10.8$; $p<0.001$ (Table 6) This test is conservative because it is mainly testing the sensitivity to currently versus previously logged areas, and not to intact forest that have not been harvested.

TABLE 6

Chi square ($\chi^2$) test of the validation results of the CLAS logging methodology.

| | | Logged No | Logged Yes |
|---|---|---|---|
| Observed ||||
| Detected | No | 37 | 2 |
| Detected | Yes | 2 | 4 |
| Expected ||||
| Detected | No | 33.8 | 5.2 |
| Detected | Yes | 5.2 | 0.8 |

* Number of harvest/image combinations that met the following criteria: harvest months were known when that knowledge was essential for validation; detection was not obviously interfered with because of proximity of clouds/cloud shadows.

Roundwood Estimates from Remote Sensing and Field Studies

The roundwood production was calculated from logging areas detected using the CLAS approach, combined with field-based relationships between remotely sensed canopy opening (PV cover), forest canopy gap fraction and roundwood harvest volumes. After the logging areas and canopy damage intensities were mapped as described in previous sections, an equation was applied to convert remotely sensed PV change of logged areas to forest canopy gap fraction. The equation was derived from intensive measurements of forest gap fraction in reduced-impact (low damage) and conventional (high damage) selective logging areas and co-located with Landsat ETM+ satellite imagery processed with the AutoMCU algorithm. This general conversion from the CLAS-derived PV fractional cover to forest canopy gap percentage was reported by Asner et al. (2005) as:

$$\text{Canopy gap} = (PV_{CLAS} - 90.0)/(-0.4)$$

$$r^2 = 0.87, p < 0.01 \qquad (2)$$

where $PV_{CLAS}$ and canopy gap are in percentage units. $PV_{CLAS}$ is a planar metric, whereas canopy gap is the hemispherical canopy opening (S8). The gap-transformed data were then used to estimate the volume of roundwood (m³)

extracted on a per-area basis using an equation drawn from 35 logging sites in Brazil, Belize, Suriname, Guyana, and Indonesia (Pereira et al., 2002):

Wood volume=3.882+108.7(Canopy gap/100)

$$r^2=0.83, p<0.0001 \tag{3}$$

Calculated roundwood extraction volumes were then compiled by logging detections (from CLAS), and mean harvest intensities were calculated by dividing the total calculated annual roundwood volume by the harvest area.

REFERENCES

G. P. Asner, *Rem. Sens. Environ.* 64, 234 (1998).
G. P. Asner, D. B. Lobell, *Rem. Sens. Environ.* 74, 99 (2000).
G. P. Asner, K. B. Heidebrecht, *Int'l J. Rem. Sens.* 23, 3939 (2002a).
G. P. Asner, M. Keller, R. Pereira, J. Zweede, *Rem. Sens. Environ.* 80, 483 (2002b).
G. P. Asner, M. M. C. Bustamante, A. R. Townsend, *Rem. Sens. Environ.* 87, 507 (2003a).
G. P. Asner, A. S. Warner, *Rem. Sens. Environ.* 87, 521 (2003b).
G. P. Asner, M. Keller, R. Pereira, J. C. Zweede, J. N. M. Silva, *Ecol. Appl.* 14, S280 (2004a).
G. P. Asner, M. Keller, J. N. M. Silva, *Global Change Biol.* 10, 765 (2004b).
G. P. Asner, D. E. Knapp, A. N. Cooper, M. M. C. Bustamante, L. P. Olander, *Earth Interactions* 9 (2005).
N. A. Chappell, W. Tych, Z. Yusop, N. A. Rahim, B. Kasran, in *Forests, Water and People in the Humid Tropics* M. Bonell, L. A. Bruijnzeel, Eds. (Cambridge University Press, Cambridge, 2005) pp. 513-532.
L. M. Curran et al., *Science* 303, 1000 (2004).
R. S. DeFries et al., *Proc. Nat. Acad. Sci.* 99, 14,256 (2002).
C. de Wasseige, P. Defourney, *For. Ecol. Manage.* 188, 161 (2004).
R. A. Fimbel, A. Grajal, J. G. Robinson, Eds., *The Cutting Edge: Conserving Wildlife in Logged Tropical Forests* (Columbia University Press, New York, 2001), pp. 808.
J. P. Gastellu-Etchegorry et al., *Rem. Sens. Environ.* 68, 281 (1999).
J. J. Gerwing, *For. Ecol. Manage.* 157, 131 (2002).
INPE (Instituto Nacional de Pesquisas Espaciais (INPE), "PRODES: Assessment of deforestation in Brazilian Amazonia (http://www.obt.inpe.br/prodes/index.html)" (2005).
Instituto-Socioambiental. (São Paulo, Brazil, 1999) Map of forest types, land-use change and protected areas in the Amazon.
M. Keller, M. Palace, G. Hurtt, *For. Ecol. Manage.* 154, 371 (2001).
M. Keller, G. P. Asner, J. N. M. Silva, M. Palace, in *Working Forests in the Neotropics: Conservation through Sustainable Management?* D. J. Zarin, J. R. R. Alavalapati, F. E. Putz, M. Schmink, Eds. (Columbia University Press, New York, 2004a) pp. 41-63.
M. Keller, M. Palace, G. P. Asner, R. Pereira, J. N. M. Silva, *Global Change Biol.* 10, 784 (2004b).
E. F. Lambin, H. J. Geist, E. Lepers, *Ann. Rev. Environ. Res.* 28, 205 (2003).
J. A. Marengo, B. Liebman, V. E. Kousky, N. P. Filizola, I. C. Wainer, *J. Climate* 14, 833 (2001).
D. C. Nepstad et al., *Nature* 398, 505 (1999).
R. Pereira, J. Zweede, G. P. Asner, M. Keller, *For. Ecol. Manage.* 168, 77 (2002).
J. Reed, *Photogramm. Eng. Rem. Sens.* 69, 275 (2003).
D. A. Roberts, M. O. Smith, J. B. Adams, *Rem. Sens. Environ.* 44, 255 (1993).
J. N. M. Silva et al., *For. Ecol. Manage.* 71, 267 (1995).
C. Souza, P. Barreto, *Int'l J. Rem. Sens.* 21, 173 (2000).
C. Souza, L. Firestone, L. M. Silva, D. Roberts, *Rem. Sens. Environ.* 87, 494 (2003).
T. A. Stone, P. Lefebvre, *Int'l J. Rem. Sens.* 19, 2517 (1998).
C. Uhl, A. Verissimo, M. M. Mattos, Z. Brandino, I. C. G. Vieira, *For. Ecol. Manage.* 46, 243 (1991).
S. G. Ungar, J. S. Pearlman, J. A. Mendenhall, D. Reuter, *IEEE Trans. Geosci. Rem. Sens.* 41, 1149 (2003).
A. Verissimo, P. Barreto, R. Tarifa, C. Uhl, *For. Ecol. Manage.* 72, 39 (1995).
A. Verissimo, P. Barreto, M. Mattos, R. Tarifa, C. Uhl, *For. Ecol. Manage.* 55, 169 (1992).
E. F. Vermote, D. Tanre, J. L. Deuze, M. Herman, J. J. Morcrette, *IEEE Trans. Geosci. Rem. Sens.* 35, 675 (1997).

The foregoing detailed description has been given for clearness of understanding only and no unnecessary limitations should be understood therefrom as modifications will be obvious to those skilled in the art.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

The disclosures of each and every patent, patent application, and publication cited herein including but limited to the references listed immediately above are hereby incorporated herein by reference in their entirety. This application includes and incorporates in its/their entirety the attached CLAS software printouts and supporting documents, all of which are individually listed on the 'Provisional Application For Patent Cover Sheet' accompanying the filing of this application.

What is claimed:

1. A method, comprising:
    receiving satellite image data at a computer;
    performing atmospheric correction on the satellite image data;
    masking clouds, water, and deforestation in the satellite image data;
    determining fractional material cover of photosynthetic vegetation (PV) canopy, non-photosynthetic vegetation (NPV) canopy, and bare substrate at a sub-pixel scale from the masked satellite image data;
    generating sub-pixel fractional material cover images based on the fractional material cover of the PV canopy, the NPV canopy, and the bare substrate;
    performing image differencing on the sub-pixel fractional material cover images to create images of PV and NPV change; and
    identifying areas of forest disturbance based on the images of PV and NPV change using pattern recognition.

2. The method of claim 1, wherein the pattern recognition includes pattern recognition of logging decks, logging roads, skid trails, and tree felling gaps.

3. The method of claim 1, wherein the step of identifying further comprises analyzing a cluster of pixels using a moving kernel approach.

4. The method of claim 3, wherein the moving kernel approach includes positioning an analysis kernel at a starting base kernel with four subset kernels in each of the four corners of the base kernel, and if an area of the base kernel tests positive, moving the analysis kernel to its neighboring kernel in a north, south, east, and west direction, and iterating the process until all neighboring kernels have been evaluated.

5. The method of claim 1 further comprising the step of performing a manual visual audit of probable logging event locations to add or remove potential false positives and negatives.

6. The method of claim 1, wherein the forest disturbance includes agriculture, cattle ranching, and a natural hazard.

7. The method of claim 1, wherein the step of determining further comprises spectrally decomposing each pixel of the masked satellite image data using a probabilistic spectral sub-model.

8. A system, comprising:
a computer, the computer including an atmospheric correction module, a masking module, a sub-pixel analysis module, and a pattern recognition module,
the computer configured to receive satellite image data;
the atmospheric correction module configured to perform atmospheric correction on the satellite image data;
the masking module configured to mask clouds, water, and deforestation in the satellite image data;
the sub-pixel analysis module configured to determine fractional material cover of photosynthetic vegetation (PV) canopy, non-photosynthetic vegetation (NPV) canopy, and bare substrate at a sub-pixel scale from the masked satellite image data and generate sub-pixel fractional material cover images based on the fractional material cover of the PV canopy, the NPV canopy, and the bare substrate at the sub-pixel scale; and
the pattern recognition module configured to perform image differencing on the sub-pixel fractional material cover images to create images of PV and NPV change and identify areas of forest disturbance based on the images of PV and NPV change using pattern recognition.

9. The system of claim 8, wherein the pattern recognition includes pattern recognition of logging decks, logging roads, skid trails, and tree felling gaps.

10. The system of claim 8, wherein pattern recognition module is further configured to analyze a cluster of pixels using a moving kernel approach.

11. The system of claim 10, wherein the moving kernel approach includes positioning an analysis kernel at a starting base kernel with four subset kernels in each of the four corners of the base kernel, and if an area of the base kernel tests positive, moving the analysis kernel to its neighboring kernel in a north, south, east, and west direction, and iterating the process until all neighboring kernels have been evaluated.

12. The system of claim 8, wherein the forest disturbance includes agriculture, cattle ranching, and a natural hazard.

13. The system of claim 8, wherein the sub-pixel analysis module is further configured to spectrally decompose each pixel of the masked satellite image data using a probabilistic spectral sub-model.

* * * * *